Nov. 17, 1953  D. D. SOCCOLI  2,659,295
TOAST WARMING ATTACHMENT FOR ELECTRIC TOASTERS
Filed March 17, 1952
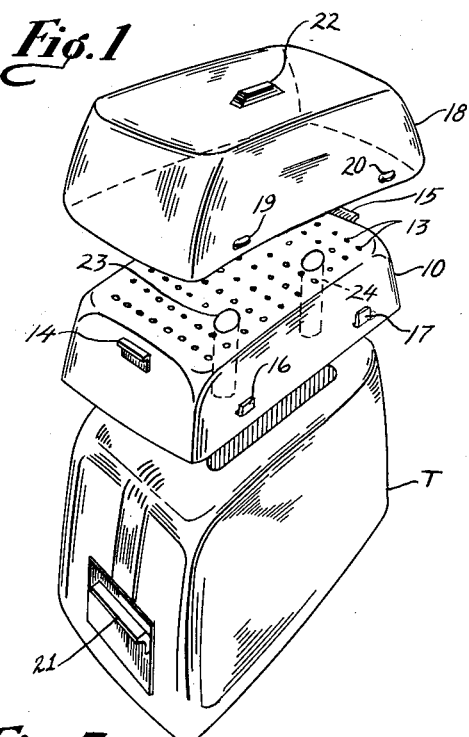
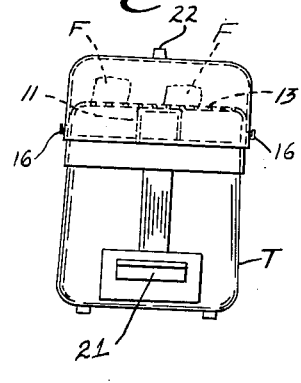
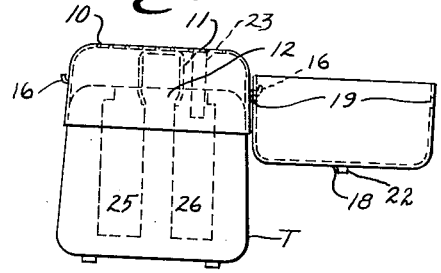
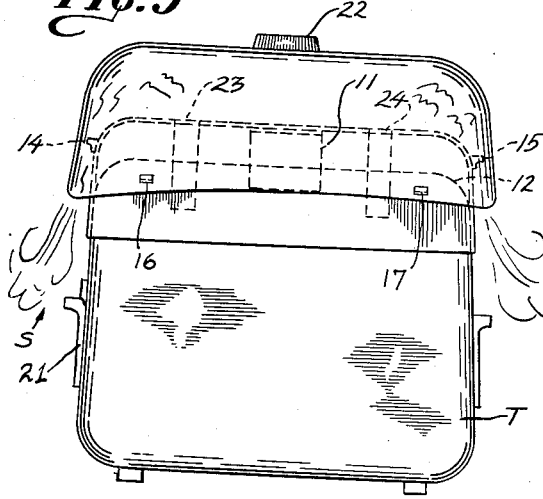
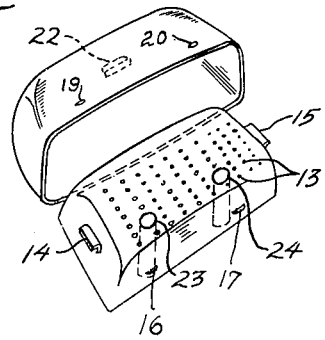
INVENTOR.
DOM D. SOCCOLI
BY H. G. Manning
ATTORNEY Patented Nov. 17, 1953

2,659,295

UNITED STATES PATENT OFFICE 2,659,295

TOAST WARMING ATTACHMENT FOR ELECTRIC TOASTERS

Dom D. Soccoli, New Britain, Conn.

Application March 17, 1952, Serial No. 276,944

5 Claims. (Cl. 99—339)

This invention relates to food heating appliances and more particularly to an attachment to be secured to the top of an electric toaster for heating articles of food, such as biscuits, muffins, buns, toast, etc., to any desired temperature.

One object of the present invention is to provide a warming attachment of the above nature which may be used to crisp or moisten the outside surface of the articles of food being heated.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing, one form in which the invention may conveniently be embodied in practice.

In the drawing:

Fig. 1 represents a perspective view, in exploded relation, of an electric toaster, the inverted perforated intermediate pan, and the top cover, embodying the present invention.

Fig. 2 is an end view of the same on a larger scale, with the parts shown assembled in operating position.

Fig. 3 is a side view of the same on a larger scale.

Fig. 4 is an end view, similar to Fig. 2, showing the hinged top cover in open position.

Fig. 5 is a perspective view of the intermediate inverted pan with the hinged top cover in partly open position.

Referring now to the drawings in which like reference numerals denote corresponding parts throughout the several views, the numeral 10 indicates an intermediate inverted pan shaped to fit snugly over the flat sides and rounded ends of a duplex electric toaster T. Attached to the inside surface of the inverted pan 10 is a depending resilient U-clip 11 which is shaped to detachably embrace the longitudinal central rib 12 of the toaster T in order to hold the pan 10 securely in operating position.

The inverted pan 10 is provided with a plurality of rows of perforations 13 to permit the heat from the toaster T to pass upwardly in the form of convection air currents for warming the articles of food located upon said pan 10.

At the ends of the pan 10, provision is made of a pair of elongated handle knobs 14, 15 constructed of heat-insulating material, in order to permit the pan to be readily removed from the toaster T without discomfort to the user's hands, whenever it is desired to use the toaster for cooking toast.

The pan 10 is provided on one or both sides with a pair of hooks 16, 17 which are adapted to be loosely embraced by slots 19, 20, in the side walls of the top cover 18 which is shaped to fit snugly over the sides of the inverted pan 10 and to fit loosely over the ends thereof, whereby the hot air S passing through the perforations 13 into the space between the pan 10 and the top cover 18, may emerge freely outwardly and downwardly from the ends of the toaster T, as shown in Fig. 3.

A usual toaster operating switch 21 is located on one end of the toaster T. The top of the cover 18 is provided with an additional upstanding handle 22 of insulating material.

In order to moisten the hot air in the warming chamber between the top cover 18 and the intermediate inverted pan 10, provision is made of a pair of open-topped water thimbles 23, 24, depending from the top of said pan and located in the toast slot 26 of the toaster T.

Operation

When it is desired to heat articles of food F such as cakes, muffins, etc., it will merely be necessary to place the inverted pan 10 snugly over the sides of the toaster T. The food F to be warmed, will then be placed upon said pan 10. The top cover 18 will then be hooked upon the pan 10 (Fig. 4), after which the cover 18 will be swung to the closed position shown in Fig. 2. When the food F is to be eaten, it will merely be necessary to lift and swing the cover 18 down into the open position shown in Fig. 4, at either side of the pan 10.

It will be understood that the cold air initially in the attachment will be pushed upwardly through the perforations 13 in the inverted pan 10, and downwardly from the heating chamber at the ends thereof.

It will also be understood that it is within the spirit and scope of this invention to employ louvers in the top of the inverted pan instead of perforations as herein disclosed.

It will also be understood that if a longer than normal period of heating is desired, it will merely be necessary to depress the heating switch 21 of the toaster as many times as desired.

While there has been disclosed in this specification one form in which the invention may be embodied, it is to be understood that this form is shown for the purpose of illustration only, and that the invention is not to be limited to the specific disclosures but may be modified and embodied in various other forms without departing from its spirit. In short, the invention contains all the modifications and embodiments coming within the scope of the following claims.

Having thus fully described the invention, what is claimed as new, and for which it is desired to secure Letters Patent, is:

1. In a food warming device, a top-slotted substantially rectangular electric toaster having rounded corners, an intermediate perforated detachable inverted pan shaped to fit snugly on the sides and ends of said toaster, a dished top cover detachably mounted upon said pan, the sides of said cover fitting closely and snugly over the sides of said pan, but the ends of said cover being loose with respect to the ends of said pan, the top of said cover being spaced sufficiently above the top of said pan to provide ample space for warming articles of food placed on said pan, and to permit the escape of hot air and steam from the warming chamber between said pan and cover.

2. The invention as defined in claim 1 in which said top cover is detachably supported on the intermediate pan by hooks and slots.

3. The invention as defined in claim 1 in which the ends of said pan and the top of said cover have manipulating handles of insulating material.

4. The invention as defined in claim 1 in which said intermediate pan has a depending resilient U-clip on its underside to detachably embrace the central rib of the top of the electric toaster.

5. The invention as defined in claim 1, in which provision is made of an open topped water thimble depending from said pan into one of the slots of the toaster to moisten the air in said warming chamber.

DOM D. SOCCOLI.

References Cited in the file of this patent

UNITED STATES PATENTS

| Number | Name | Date |
| --- | --- | --- |
| Re. 1,568 | Morrill | Nov. 10, 1863 |
| 232,896 | McConnell | Oct. 15, 1880 |
| 284,295 | Hailes | Sept. 4, 1883 |
| 1,471,039 | Lee | Oct. 16, 1923 |
| 1,614,661 | Detwiler | Jan. 18, 1927 |
| 1,714,536 | Wooderson | May 28, 1929 |
| 2,493,222 | Braucht | Jan. 3, 1950 |
| 2,556,520 | Bunce | June 12, 1951 |